Nov. 15, 1955   D. L. LOGAN   2,723,648
POULTRY WATERING DEVICE
Filed March 16, 1954   2 Sheets-Sheet 1
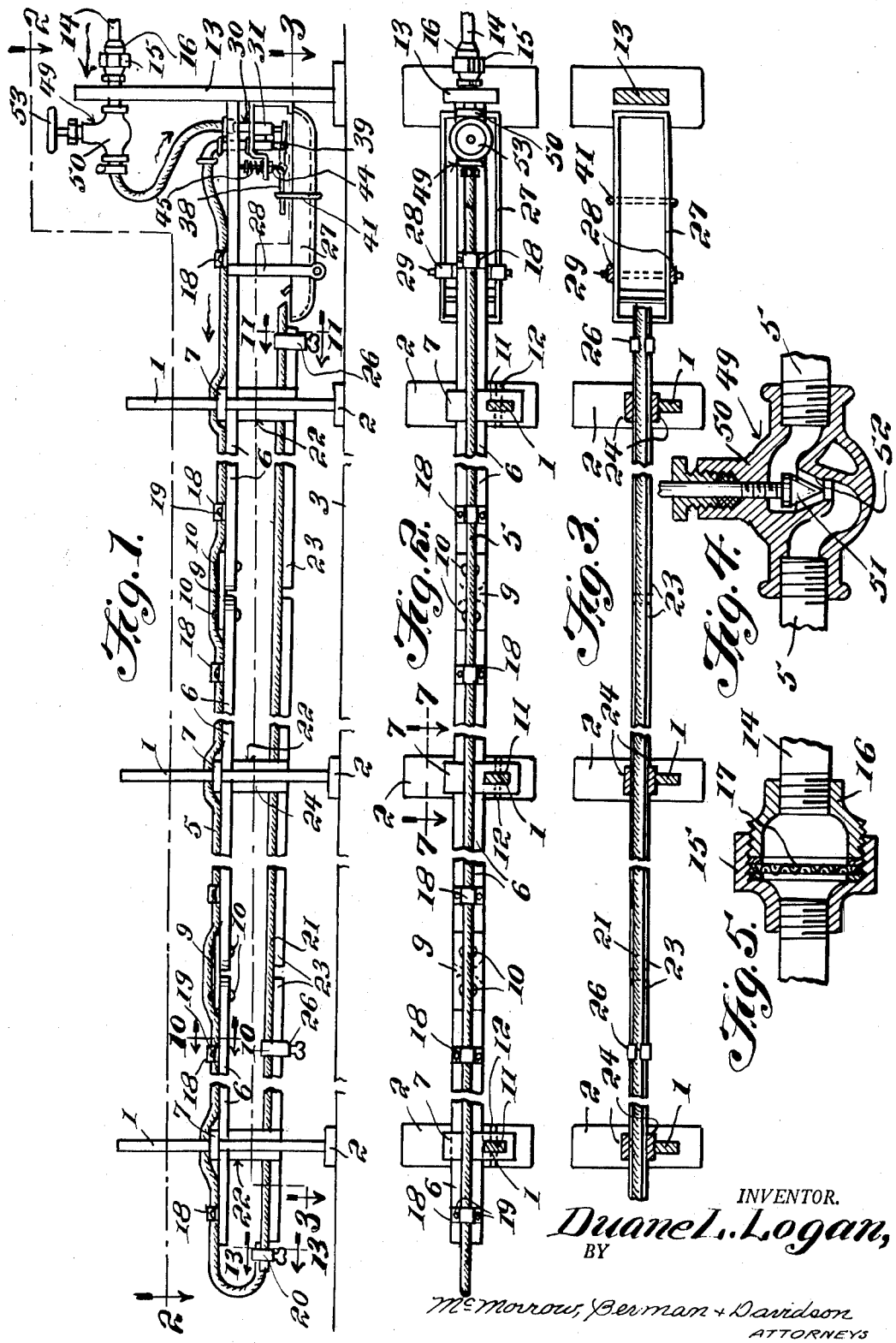
INVENTOR.
Duane L. Logan,
BY
McMorrow, Berman + Davidson
ATTORNEYS

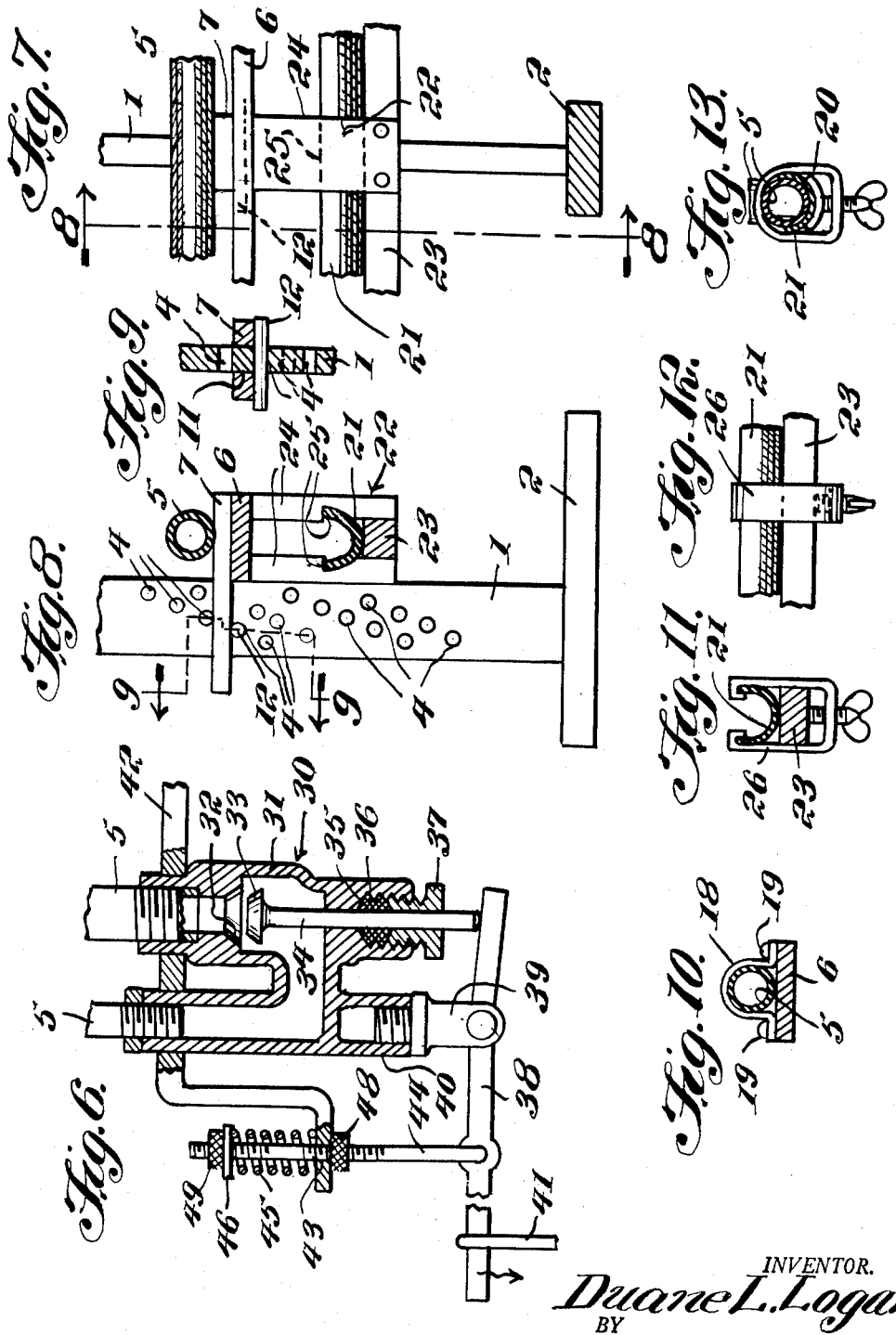

United States Patent Office 2,723,648
Patented Nov. 15, 1955

2,723,648

POULTRY WATERING DEVICE

Duane L. Logan, Pleasant Grove, Ark.

Application March 16, 1954, Serial No. 416,495

3 Claims. (Cl. 119—81)

This invention relates to poultry watering devices.

An object of the invention is to provide a poultry watering device which may be made of extended length and flexible construction adapting it to be positioned to best advantage within any given poultry area.

Another object of the invention is to provide a poultry watering device in which water flows from one end to the other, tending to keep the device clean and prevent the accumulation of sediment therein.

Another object of the invention is to provide a poultry watering device in which the flow of water is self-regulating and adjusted closely to the needs of the poultry so that excess amounts are not slopped over upon the ground to muddy the area surrounding the device.

A further object of the invention is to provide a poultry watering device from which poultry of all sizes may readily drink but into which they may not readily enter or deposit their droppings.

Other objects and advantages of the invention will appear from the following description considered in conjunction with the attached drawings, in which:

Figure 1 is a side elevational view of the device of the present invention connected to a source of water.

Figure 2 is a view taken along the line 2—2 of Figure 1.

Figure 3 is a view taken along the line 3—3 of Figure 1.

Figure 4 is a detail enlarged view in section of a needle valve positioned adjacent the inlet end of the device of the present invention.

Figure 5 is a detail enlarged view in section of an attaching means mounted upon the inlet end of the device of the present invention.

Figure 6 is a detail view in section of a valve mechanism constituting part of the device of the present invention and regulating the flow of water therethrough.

Figure 7 is an enlarged view taken along the line 7—7 of Figure 2, on an enlarged scale.

Figure 8 is a view taken along the line 8—8 of Figure 7.

Figure 9 is a view taken along the line 9—9 of Figure 8.

Figure 10 is a view taken along the line 10—10 of Figure 1, on an enlarged scale.

Figure 11 is a view taken along the line 11—11 of Figure 1, on an enlarged scale.

Figure 12 is a side elevational view of the assembly of Figure 11.

Figure 13 is a view taken along the line 13—13 of Figure 1, on an enlarged scale.

Referring now to the drawings in more detail, the reference numeral 1 designates a plurality of standards arranged in longitudinal, spaced relation. Each standard 1 rises from a flat base 2 adapted to rest solidly upon a ground surface 3. Each standard 1 is provided with a plurality of spaced apertures 4 extending transversely therethrough at different elevations above the base 2.

A flexible conduit 5, adapted to carry water under pressure, extends longitudinally of and is supported by the standards 1. Specifically, the conduit 5 is carried by a conduit shelf 6 which likewise extends longitudinally of the standards 1 and is connected to each of the standards 1 by means of a bracket arm 7. The conduit shelf 6 consists of a plurality of strips, of wood or similar material, arranged in longitudinal end-to-end spaced relation and having their confronting ends hingedly connected together by means of a link 9 which overlaps the confronting ends and is pivotally connected to each by means of pivot pins 10. The bracket arm 7 consists of a short block or strip having the under face of one end portion fixedly secured to the upper face of the adjacent portion of the conduit shelf and having a closed slot 11 in its other end portion. The slot 11 conformably fits the standard 1 and permits the bracket arm 7 to be received upon the standard 1 with the end portion connected to the conduit shelf 6 extending horizontally therefrom. The bracket arm 7 may be supported at any of a number of levels above the base 2 by the insertion of a pin 12 through the aperture 4 at the selected level to carry the bracket arm 7 at that level, as shown in Figures 7 and 8. One end of the conduit 5 is shown in Figure 1 as extending through an upright 13 and connecting with a source of water under pressure 14 by means of a hose coupling 15 which threadably engages a nipple 16 on the end of the source 14. The conduit 5 is secured upon the shelf 6 by means of spaced U-clamps 18, shown in detail in Figure 10, which are fastened to the shelf 6 by screws 19. A circular sheet of screening 17 is interposed between the end of the nipple 16 and the abutting inner face of the hose coupling 15 to strain the water as it enters the conduit 5.

The other end of the conduit 5 is connected, by means of a screw clamp 29 as shown in detail in Figure 13, to one end of a trough 21 positioned so as to receive water issuing from said end of the conduit 5. The trough 21 extends longitudinally of the standards 1 and is supported thereon at an elevation above the ground surface 3 and spaced below the level of the conduit shelf 6. Specifically, the trough 21 is supported in a plurality of slings 22 which consists of an elongated bottom 23 extending longitudinally of the standards 1 and secured between the lower ends of a pair of parallel, spaced straps or blocks 24 which have their tops fixedly secured to the under side of the portion of the complemental strip 8 which is connected to the bracket arm 7, as shown in Figure 8. The ends of each bottom 23 extend in both directions from the straps 24 and approach but are spaced from the oppositely extending ends of the bottoms of the slings on either side thereof, forming an almost continuous support for the trough 21. The bottom of the trough 21 rests upon the upper surface of the bottoms 23 and the sides of the trough are received in facing notches 25 formed in the confronting faces of the straps 24 and holding the trough 21 in proper position in the slings 22. Intermediate the straps 24, the trough 21 is secured to the extending portion of the bottoms 23 by means of spaced screw clamps 26, shown in detail in Figure 11.

A horizontally disposed pan 27 is positioned below the other end of the trough 21 so as to receive water issuing therefrom. The pan 27 is connected between a pair of legs 28, depending from opposite sides of the adjacent portion of the shelf 6, for tilting movement about a horizontal axis, or pivot bar 29, connecting the lower ends of the legs 28, extending transversely beneath the pan 27 adjacent one of its ends.

An openable and closable valve, generally designated 30, is connected within the conduit 5 and is operable in response to tilting movement of the pan 27 to shut off the flow of water to the trough 21. The valve 30 consists of a U-shaped tubular member 31 connected into the conduit 5 adjacent its inlet end having a valve seat 32 in one leg thereof, a valve head 33 movable into and out of closing relation with respect to the seat 32 and a valve stem 34 extending slidably through and exteriorly of the lower wall of the member 31. A recess 35 extends inwardly from the lower surface of the member 31 and surrounding the valve stem 34 and is partially filled with packing 36 which is tightened into sealing contact with the valve stem 34, to prevent leakage of water therealong, by means of packing sleeve 37 which is threadably engaged in the walls of the recess 35. A horizontally disposed lever arm 38 is pivoted intermediate its ends upon the lower portion of a lug 39 which depends from and has its upper portion threadably engaged in a sleeve 40 extending downwardly from the bottom of the member 31. The upper face of one end portion of the lever arm 38 abuts the lower end of the valve stem 34 and the other end of the lever arm 38 is connected to the pan 27 by means of a wire loop 41 which depends from the lever arm 38 and embraces the bottom of the pan 27 intermediate the pivot bar 29 and the end of the pan remote therefrom. The valve 30 is supported by a bracket 42 which is secured to the upright 13. The free end of the bracket 42 is offset downwardly and provided with an aperture 43 through which extends slidably an upstanding adjustment bar 44. The lower end of the bar 44 is hooked through the lever arm 38 intermediate the loop 41 and the lug 39. A coiled spring 45 surrounds the adjustment bar 44 and acts upon a washer 46 and an adjustment nut 47 in adjustable threaded engagement with the upper end of the adjustment bar 44 to move the end of the lever arm 38 out of engagement with the valve stem 34 permitting the valve head 33 to move to the open position. A second adjustment nut 48, threadably engaged upon the adjustment bar 44 intermediate its ends, bears upon the under side of the adjacent portion of the bracket 42 and serves as a means for adjusting the level of the pan 27.

Intermediate the valve 30 and the hose coupling 15 upon the inlet end of the conduit 5 is a valve assembly 49 inserted into the conduit 5. The valve assembly 49 consists of the housing 50 enclosing a needle valve 51 which seats upon a valve seat 52 when operated by means of a hand wheel 53, as shown in detail in Figure 4.

In practice, an ordinary garden hose may be used as the conduit 5 and a one-half section of polyethylene pipe may be used for the trough 21. The flexibility of these members, the hinged connections between the strips 8 which constitute the conduit shelf 6 and the spacing of the bottoms 23 make it possible to move the device of the present invention freely and easily and to accommodate it to the shape and size of a particular poultry area. Lengths of trough up to one hundred feet have been found to be practical in use. When the device has been located in the desired position within a poultry area, the elevation of the trough 21 above the ground or floor surface is adjusted by means of the pins 12 and the apertures 4 to a level suitable for the size of the poultry to be using the trough. The valve 49 is then opened by means of the hand wheel 53 and water enters the conduit 5 from the source 14 and is discharged from the conduit 5 into the trough 21. As the water runs along the trough 21, it is available to the poultry and if it is consumed by them as it moves along the trough very little reaches the pan 27. If, however, the poultry do not consume all of the water as it moves along the trough 21, it accumulates in the pan 27 and its weight depresses the free end of the pan, causing the loop 41 to move downward and turning the lever arm 38 so as to close the valve 30, shutting off the supply of water to the trough 21. The valve 30 will be held in the closed position as long as sufficient water remains in the pan 27 to hold it in the tilted position. When the level of the water in the pan 27 has been lowered by the drinking of the poultry or by evaporation, the spring 45 will cause the raising of the pan from its tilted position and the opening of the valve 30 so that additional water will pass through the conduit 5 and into the trough 21. Thus, the opening and closing of the valve 30 will be repeated continuously as required to keep a supply of water passing through the trough 21 and into the pan 27 in an amount adjusted to the demands of the poultry. The water in the trough 21 at any time is relatively shallow and consequently is not as susceptible to being slopped over the sides by the drinking of the poultry as in the case when the drinking water is held stationary in a relatively large container. Moreover, the movement of the water through the trough 21 keeps the trough 21 free of accumulating dirt and only the pan 27 need be washed frequently. The conduit shelf 6, being positioned directly above the trough 21, may be so spaced that without interfering in any way with the drinking of the poultry, it will prevent them from climbing into the trough and depositing their droppings therein. At the same time, the shelf 6 will serve as a roost.

What is claimed is:

1. A poultry watering device comprising a trough supported at an elevation with respect to a ground surface, a flexible conduit adapted to contain a source of water under pressure positioned above and spaced from said trough and extending along said trough, one end of said conduit being connected in communication with one end of the trough to discharge water issuing therefrom into said trough, a horizontally disposed pan positioned below and connected to the other end of said trough to receive water issuing therefrom, said pan being tiltable about a horizontal axis adjacent one of its ends, and an openable and closable valve in said conduit and operable in response to tilting movement of said pan to close said valve and shut off the flow of water to said trough.

2. A poultry watering device comprising a trough supported at an elevation with respect to a ground surface, a flexible conduit adapted to contain a source of water under pressure positioned above and spaced from said trough and extending along said trough, one end of said conduit being connected in communication with one end of the trough to discharge water issuing therefrom into said trough, a horizontally disposed pan positioned below and connected to the other end of said trough to receive water issuing therefrom, said pan being tiltable about a horizontal axis adjacent one of its ends, an openable and closable valve in said conduit and operable in response to tilting movement of said pan to close said valve and shut off the flow of water to said trough, and spring means operatively connected to said valve for biasing said valve to its open position.

3. A poultry watering device comprising a plurality of standards arranged in longitudinal spaced relation, a trough extending longitudinally of said standards and supported thereupon at an elevation above a ground surface, a horizontally disposed pan positioned below one end of said trough so as to receive water issuing therefrom and dependingly connected to two adjacent standards for tilting movement about a horizontal axis adjacent one of its ends, a flexible conduit adapted to contain water under pressure extending longitudinally of and above said trough and supported by said standards and having one end positioned adjacent to and connected in communication with the other end of said trough to discharge water into the other end of said trough, and an openable and closable valve in said conduit and operable in response to tilting movement of said pan to close said valve and shut off the flow of water to said trough.

References Cited in the file of this patent

UNITED STATES PATENTS

| | | |
|---|---|---|
| 462,844 | Knox | Nov. 10, 1891 |
| 638,842 | Glenn | Dec. 12, 1899 |
| 1,646,705 | Peiler | Oct. 25, 1927 |
| 1,747,195 | Triggs et al. | Feb. 18, 1930 |
| 1,753,122 | Kielsmeier | Apr. 1, 1930 |
| 2,011,684 | Martin | Aug. 20, 1935 |
| 2,043,477 | Imschweiler | June 9, 1936 |